US009869988B2

United States Patent
Abe et al.

(10) Patent No.: US 9,869,988 B2
(45) Date of Patent: Jan. 16, 2018

(54) PROGRAMMABLE CONTROLLER SYSTEM FOR PERFORMING ANALOG-TO-DIGITAL CONVERSION BASED ON AN ADJUSTABLE CONVERSION CHARACTERISTIC TABLE

(71) Applicant: Mitsubishi Electric Corporation, Tokyo (JP)

(72) Inventors: Hiroshi Abe, Tokyo (JP); Satoru Ukena, Tokyo (JP); Koichi Ishida, Aichi (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 149 days.

(21) Appl. No.: 14/888,741

(22) PCT Filed: Mar. 7, 2014

(86) PCT No.: PCT/JP2014/056055
§ 371 (c)(1),
(2) Date: Nov. 3, 2015

(87) PCT Pub. No.: WO2015/132972
PCT Pub. Date: Sep. 11, 2015

(65) Prior Publication Data
US 2016/0085225 A1 Mar. 24, 2016

(51) Int. Cl.
*G05B 19/05* (2006.01)
(52) U.S. Cl.
CPC ........... *G05B 19/05* (2013.01); *G05B 19/054* (2013.01); *G05B 2219/1126* (2013.01); *G05B 2219/1176* (2013.01)
(58) Field of Classification Search
CPC .................. G05B 19/05; G05B 19/054; G05B 2219/1126; G05B 2219/1176
(Continued)

(56) References Cited

U.S. PATENT DOCUMENTS 6,308,231 B1 * 10/2001 Galecki ................ G05B 19/054
702/127
6,917,835 B2    7/2005 Oyama et al.
(Continued)

FOREIGN PATENT DOCUMENTS

DE    112012007097 T5    7/2015
JP    61-056516 A    3/1986
(Continued)

OTHER PUBLICATIONS

Communication dated Aug. 5, 2016, issued by the German Patent Office in counterpart German Application No. 112014001980.1.
Notice of Rejection for JP 2014-536807 dated Oct. 7, 2014.
International Search Report for PCT/JP2014/056055 dated May 20, 2014.

*Primary Examiner* — Chun Cao
(74) *Attorney, Agent, or Firm* — Sughrue Mion, PLLC; Richard C. Turner

(57) ABSTRACT

An analog input unit as an analog unit attached to a PLC includes an A/D converting unit as a first converting unit performing conversion between an analog value and a digital value according to a first conversion characteristic, a shared memory as a retaining unit retaining a conversion characteristic table indicating a second conversion characteristic of conversion between digital values, and a conversion processing unit as a second converting unit converting a digital value according to the second conversion characteristic by referring to the conversion characteristic table. The conversion characteristic table includes combinations of a first value that is a digital value and a second value that is a conversion result of the first value, the number of which corresponds to resolution of a digital value in the analog unit, and the second value of each of the combinations of the first value and the second value can be adjusted.

8 Claims, 11 Drawing Sheets

(58) Field of Classification Search
USPC .............................................................. 700/6
See application file for complete search history.

(56) References Cited

U.S. PATENT DOCUMENTS

| | | | |
|---|---|---|---|
| 8,543,744 B2* | 9/2013 | Onishi | G05B 19/054 |
| | | | 710/54 |
| 9,369,145 B2* | 6/2016 | Ochiai | G06F 3/0614 |
| 9,398,080 B2* | 7/2016 | Mizutani | G05B 19/05 |
| 2008/0186006 A1 | 8/2008 | Chapuis | |
| 2015/0317260 A1 | 11/2015 | Togano | |

FOREIGN PATENT DOCUMENTS

| | | |
|---|---|---|
| JP | 06-009233 U | 2/1994 |
| JP | 07-044090 A | 2/1995 |
| JP | 07-086943 A | 3/1995 |
| JP | 2000-106631 A | 4/2000 |
| JP | 2000-122706 A | 4/2000 |
| JP | 2001-042906 A | 2/2001 |
| JP | 2001-044833 A | 2/2001 |
| JP | 2002-073118 A | 3/2002 |
| JP | 2002-100990 A | 4/2002 |
| JP | 2002-108422 A | 4/2002 |
| JP | 2002-175102 A | 6/2002 |
| JP | 2004-265001 A | 9/2004 |

* cited by examiner

FIG.3

CONVERSION CHARACTERISTIC TABLE

| ADDRESS | CONVERSION DATA |
|---|---|
| 0 | 0 |
| 1 | 0 |
| 2 | 1 |
| 3 | 1 |
| 4 | 1 |
| 5 | 1 |
| ⋮ | ⋮ |
| 11998 | 1998 |
| 11999 | 1999 |
| 12000 | 4000 |
| 12001 | 4000 |
| 12002 | 6000 |
| 12003 | 8000 |
| 12004 | 10000 |
| ⋮ | ⋮ |
| 19997 | 18102 |
| 19998 | 18101 |
| 19999 | 18100 |
| 20000 | 18100 |

PROGRAMMABLE CONTROLLER SYSTEM FOR PERFORMING ANALOG-TO-DIGITAL CONVERSION BASED ON AN ADJUSTABLE CONVERSION CHARACTERISTIC TABLE

CROSS REFERENCE TO RELATED APPLICATIONS

This application is a National Stage of International Application No. PCT/JP2014/056055 filed Mar. 7, 2014, the contents of all of which are incorporated herein by reference in their entirety.

FIELD

The present invention relates to an analog unit, a conversion-characteristic-table creation device, and a programmable controller (PLC) system, and more particularly, to an analog unit attached to a PLC.

BACKGROUND

An analog input unit is a device having an A/D conversion function to convert analog values to digital values. The conversion characteristic of an analog input unit for converting analog values to digital values is usually indicated by a straight line connecting two points on a two-dimensional graph having an analog-value axis and a digital-value axis. For example, after the conversion characteristic is calibrated when the analog input unit is shipped as a product, even if the user desires to change the conversion characteristic, only the gradient of the straight line can be adjusted in most cases. Further, to change the conversion characteristic significantly, computing of analog values needs to be incorporated into a program running in the CPU unit that controls a PLC. In such a case, the load for creating the program increases.

A/D conversion in an analog input unit involves computing being performed by a program running in the CPU unit. Thus, the processing time for A/D conversion depends on the control cycle (scan time) of the CPU unit. Consequently, it is difficult for the analog input unit to sufficiently exhibit high-speed and fixed-cycle input/output performance. A similar problem occurs with an analog output unit. An analog output unit is a device having a D/A conversion function to convert digital values to analog values.

An analog input/output unit is a device having both an A/D conversion function and a D/A conversion function. In some analog input/output units, the conversion characteristic for converting analog input to analog output is indicated by a continuous straight line connecting a plurality of variable points. For example, the number of variable points is generally up to approximately ten. Also in this case, to realize any further significant change in the conversion characteristic, computing of analog values needs to be incorporated into a program running in the CPU unit that controls a PLC.

The coordinates of a variable point are usually set as numerical values. When the conversion characteristic is adjusted by setting numerical values, it is difficult to visually image the conversion characteristic. When computing of analog values is incorporated into a program running in the CPU unit, it is also difficult to check the conversion characteristic visually. Therefore, operations for adjusting the conversion characteristic and debugging operations become complicated.

CITATION LIST

Patent Literatures

Patent Literature 1: Japanese Patent Application Laid-open No. 2001-42906
Patent Literature 2: Japanese Patent Application Laid-open No. 2001-44833

SUMMARY

Technical Problem

The present invention has been achieved in view of the above problems, and an object of the present invention is to provide an analog unit, a conversion-characteristic-table creation device, and a programmable controller system that can freely adjust a conversion characteristic by performing a simple operation without using a complicated program and can sufficiently provide high-speed and fixed-cycle input/output performance.

Solution to Problem

In order to solve the above problems and achieve the object, an aspect of the present invention is an analog unit attached to a programmable controller (PLC) including: a first converting unit that performs conversion between an analog value and a digital value according to a first conversion characteristic; a retaining unit that retains a conversion characteristic table indicating a second conversion characteristic of conversion between digital values; and a second converting unit that converts a digital value according to the second conversion characteristic by referring to the conversion characteristic table retained in the retaining unit, wherein the conversion characteristic table includes combinations of a first value that is a digital value and a second value that is a conversion result of the first value, number of the combinations corresponding to a resolution of a digital value in the analog unit, and the second value of each of the combinations of the first value and the second value is capable of being adjusted.

Advantageous Effects of Invention

An analog unit according to the present invention can adjust a conversion characteristic table such that a digital value is converted to an arbitrary value at each point corresponding to the resolution. The analog unit can obtain the desired conversion characteristic without using a complicated program because the need to compute analog values with a program running in the CPU unit is eliminated. The analog unit can sufficiently exhibit high-speed and fixed-cycle input/output performance because the need for the CPU unit to perform program operations is eliminated. Consequently, an effect is obtained where the conversion characteristic can be freely adjusted by performing a simple operation without using a complicated program, and high-speed and fixed-cycle input/output performance can be sufficiently provided.

BRIEF DESCRIPTION OF DRAWINGS

FIG. 3 is a diagram illustrating an example of a configuration of a conversion characteristic table.

DESCRIPTION OF EMBODIMENTS

Exemplary embodiments of an analog unit, a conversion-characteristic-table creation device, and a programmable controller system according to the present invention will be explained below in detail with reference to the accompanying drawings. The present invention is not limited to the embodiments. In the following descriptions, an analog input unit, an analog output unit, and an analog input/output unit are generally referred to as an "analog unit".

First Embodiment

Figure 1:
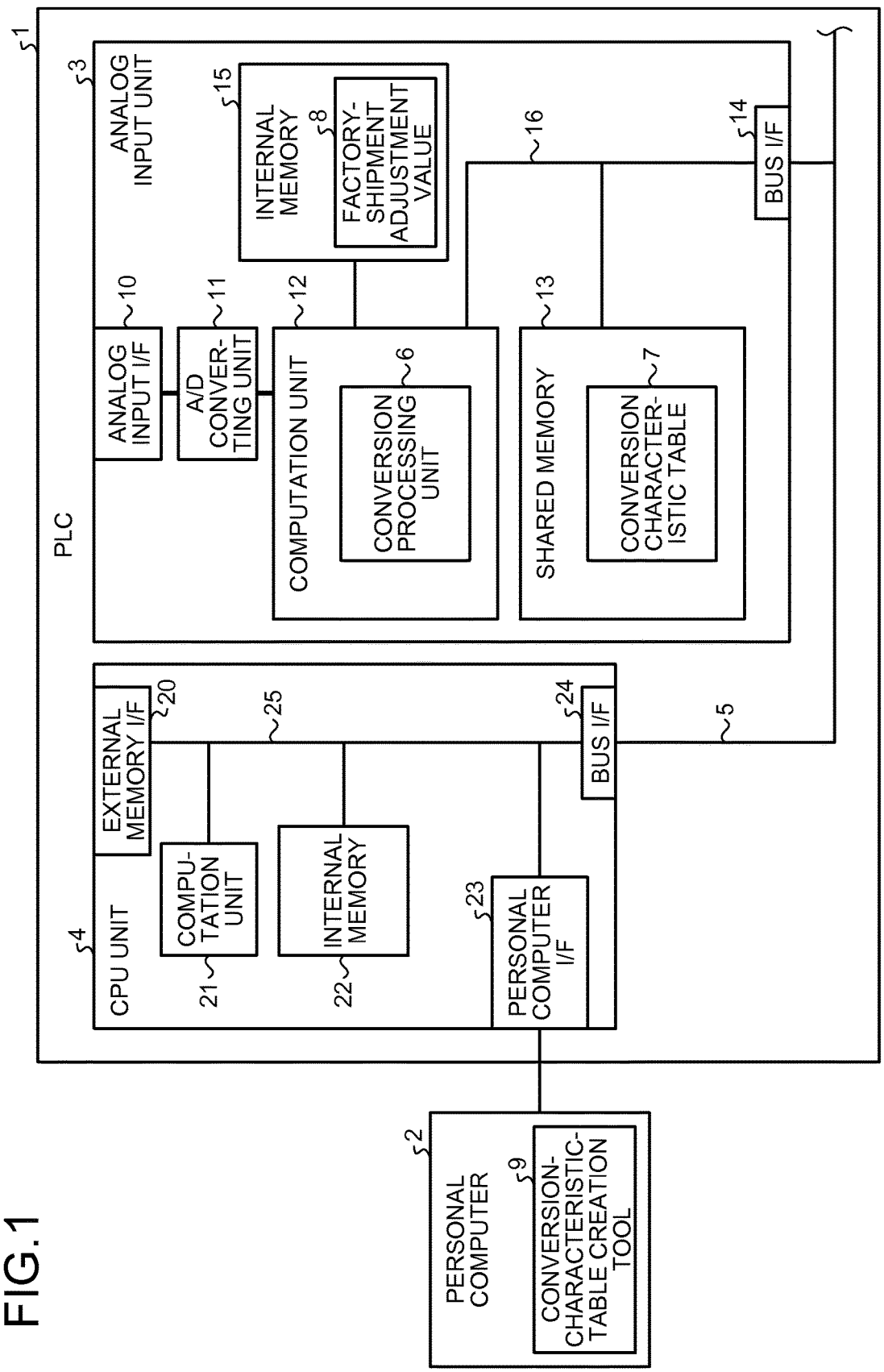
FIG. 1 is a block diagram illustrating a configuration of a PLC system according to a first embodiment of the present invention.

FIG. 1 is a block diagram illustrating a configuration of a PLC system according to a first embodiment of the present invention. The PLC system is a system including a PLC 1 and a peripheral device connected to the PLC 1. The PLC system includes the PLC 1 and a personal computer 2.

The personal computer 2 is a peripheral device connected to the PLC 1. The PLC system may include various peripheral devices (not illustrated) provided according to their purposes, in addition to the personal computer 2. In the following descriptions, descriptions of the peripheral devices excluding the personal computer 2 are omitted.

An analog input unit 3 that is an analog unit is attached to the PLC 1. The analog input unit 3 is connected to a CPU unit 4 via an inter-unit bus 5. The analog input unit 3 and the CPU unit 4 constitute a part of the PLC 1. The inter-unit bus 5 connects units attached to the PLC 1 to each other. In addition to the analog input unit 3 and the CPU unit 4, various units (not illustrated) are attached to the PLC 1 via the inter-unit bus 5 according to their purposes.

Examples of the various units include a motion controller unit and a temperature controller unit. The motion controller unit controls a servo amplifier or the like to execute multi-axial position control. The temperature controller unit outputs a temperature control signal for controlling heating/cooling such that a temperature indicated by the CPU unit 4 is reached. In the following descriptions, descriptions of the various units excluding the analog input unit 3 and the CPU unit 4 are omitted.

The analog input unit 3 receives an input of an analog value to the PLC 1 from the outside. Various measurement values, such as a flow rate, a pressure, and a temperature, which are related to an industrial device to be controlled by the PLC 1, are converted to a current value or a voltage value that is an analog value by various sensors. The analog value from the various sensors is input to the analog input unit 3. The analog input unit 3 converts the input analog value to a digital value (an A/D conversion value) successively.

The analog input unit 3 includes an analog input interface (I/F) 10, an A/D converting unit 11, a computation unit 12, a shared memory 13, a bus interface (I/F) 14, and an internal memory 15.

The analog input I/F 10 receives an input of an analog value to the analog input unit 3. The A/D converting unit 11 converts the analog value to a digital value. The computation unit 12 executes control of the entire analog input unit 3. The computation unit 12 includes a conversion processing unit 6. The conversion processing unit 6 performs conversion on the digital value that is the conversion result in the A/D converting unit 11.

The shared memory 13 stores therein an A/D conversion value that is the conversion result by the A/D converting unit 11 and the conversion processing unit 6, the computation result by the computation unit 12, and a conversion characteristic table 7. The shared memory 13 is a retaining unit that retains the conversion characteristic table 7. Data is read and written by the computation unit 12 from and into the shared memory 13. Further, data can be read and written by the CPU unit 4 from and into the shared memory 13. The CPU unit 4 reads data from the shared memory 13 and writes data into the shared memory 13, via the inter-unit bus 5.

The bus I/F 14 is a communication interface for communicating with another unit, for example, the CPU unit 4, via the inter-unit bus 5. The internal memory 15 is connected to the computation unit 12. The internal memory 15 is a nonvolatile memory that stores therein various setting values set in the analog input unit 3. The internal memory 15 stores therein a factory-shipment adjustment value 8 that is set in the analog input unit 3 in advance. The internal memory 15, the computation unit 12, the shared memory 13, and the bus I/F 14 are connected to one another via an internal bus 16.

The CPU unit 4 controls operations of the various units included in the PLC 1. The CPU unit 4 repeatedly executes a user program, outputs the execution result, and obtains input values such as values to be used by the user program, at a predetermined cycle. The user program is a program for controlling an industrial device. The operations repeated at a predetermined cycle by the CPU unit 4 are referred to as "cyclic process". The CPU unit 4 reads a digital value (an A/D conversion value) from the shared memory 13 as a part of the input-value obtaining operation in the cyclic process.

The CPU unit 4 includes an external memory interface (I/F) 20, a computation unit 21, an internal memory 22, a personal computer interface (I/F) 23, and a bus interface (I/F) 24.

The external memory I/F 20 is an interface for accessing an external memory, for example, a memory card. The external memory stores therein a user program, data required for execution of the user program, and data that is the result of execution of the user program. The computation unit 21 executes the user program. The computation unit 21 controls the entire CPU unit 4.

The internal memory 22 stores therein data required for execution of the user program, and an input value and an output value of the user program. The personal computer I/F 23 is an interface for connecting with the personal computer 2.

The bus I/F 24 is a communication interface for communicating with another unit, for example, the analog input unit 3, via the inter-unit bus 5. The external memory I/F 20, the computation unit 21, the internal memory 22, the personal computer I/F 23, and the bus I/F 24 are connected to one another via an internal bus 25.

The personal computer 2 displays the setting of the user program and information stored in the internal memory 22. A conversion-characteristic-table creation tool 9 is installed in the personal computer 2.

The conversion-characteristic-table creation tool 9 is software having a function of creating the conversion characteristic table 7. The personal computer 2 that is hardware having the conversion-characteristic-table creation tool 9 installed therein functions as a conversion-characteristic-table creation device. The conversion-characteristic-table creation tool 9 may be installed in any other hardware other than the personal computer 2.

Figure 2:
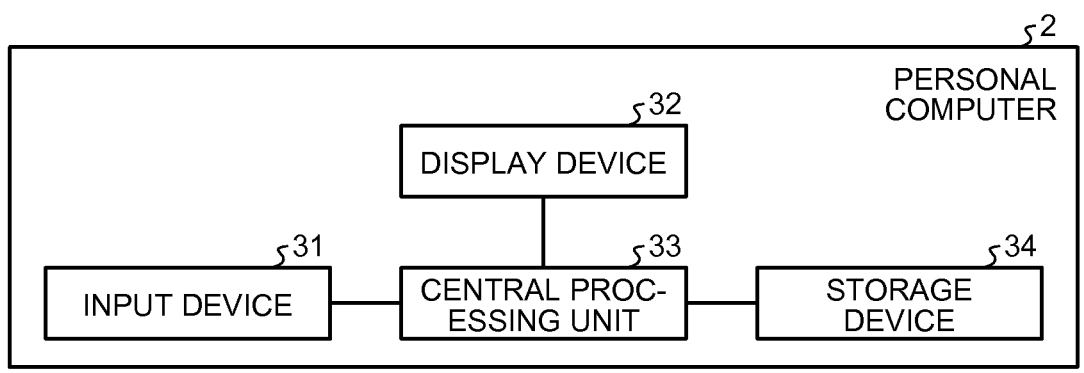
FIG. 2 is a diagram illustrating an entire configuration of a personal computer.

FIG. 2 is a diagram illustrating an entire configuration of a personal computer. For example, the personal computer 2 includes an input device 31, a display device 32, a central processing unit 33, and a storage device 34. The input device 31 is a keyboard, a pointing device, or the like. The display device 32 is a liquid crystal display or the like. The central processing unit 33 is a CPU (Central Processing Unit). The storage device 34 includes a ROM (Read Only Memory), a RAM (Random Access Memory), an external storage device, and the like.

A nonvolatile memory constituting the storage device 34 stores therein setting data of the conversion-characteristic-table creation tool 9. A volatile memory constituting the storage device 34 is appropriately used as a work memory when the central processing unit 33 performs various computing processes. The functions of the conversion-characteristic-table creation tool 9 are realized with the use of the central processing unit 33 and the storage device 34.

The conversion-characteristic-table creation tool 9 creates the conversion characteristic table 7 in response to the input from the input device 31. The conversion-characteristic-table creation tool 9 reads the conversion characteristic table 7 from the shared memory 13 and writes the conversion characteristic table 7 into the shared memory 13, via the CPU unit 4.

The analog input unit 3 converts the analog value input to the analog input I/F 10 to a digital value in the A/D converting unit 11. The A/D converting unit 11, which is a first converting unit, performs A/D conversion of analog values to digital values. The A/D converting unit 11 performs conversion between analog values and digital values according to a first conversion characteristic. The first conversion characteristic is indicated by a straight line connecting two points in a two-dimensional graph having an analog-value axis and a digital-value axis.

The computation unit 12 performs computation on a digital value that is the conversion result in the A/D converting unit 11 according to the factory-shipment adjustment value 8 read from the internal memory 15. The factory-shipment adjustment value 8 is an adjustment value set to calibrate the first conversion characteristic when the analog input unit 3 is shipped from the factory as a product. Adjustment of a digital value by the computation according to the factory-shipment adjustment value 8 corresponds to adjustment of the gradient of a straight-line graph indicating the first conversion characteristic.

In this manner, the analog input unit 3 temporarily converts an analog value to a digital value on the basis of the first conversion characteristic that is calibrated at the shipment. The computation unit 12 may eliminate the computation using the factory-shipment adjustment value 8 as appropriate, depending on the circumstances such as a case where the factory-shipment adjustment value 8 is not set in the analog input unit 3.

The conversion processing unit 6 converts the digital value on which the computation according to the factory-shipment adjustment value 8 has been performed according to a second conversion characteristic. The conversion processing unit 6 converts a digital value by referring to the conversion characteristic table 7 retained in the shared memory 13. The conversion characteristic table 7 indicates the second conversion characteristic of conversion between digital values.

FIG. 3 is a diagram illustrating an example of a configuration of a conversion characteristic table. The conversion characteristic table 7 includes a column indicating addresses and a column indicating conversion data. Each value stored in the column of addresses represents a digital value that is the conversion result based on the first conversion characteristic. Each value stored in the column of addresses is a first value.

Each value stored in the column of conversion data represents a digital value that is the conversion result from the digital value that is the first value. Each value stored in the column of conversion data is a second value. Each row of the conversion characteristic table 7 indicates a combination of the first value and the second value. The conversion characteristic table 7 includes combinations of the first value and the second value, the number of which corresponds to the resolution of a digital value in the analog input unit 3. The conversion characteristic table 7 includes pieces of the conversion data corresponding to the respective digital values which the analog input unit 3 can output.

For example, it is assumed that the resolution of a digital value is $1/20000$ and the output from the analog input unit 3 can take digital values of "0" to "20000". In this case, the conversion characteristic table 7 stores therein 20001 combinations of the first value and the second value. The analog input unit 3 loads the data of the conversion characteristic table 7 into the shared memory 13 from which data can be read at high speed.

The conversion processing unit 6 reads the conversion data stored in the same row of address as a digital value obtained by the conversion based on the first conversion characteristic, from the conversion characteristic table 7. Accordingly, the conversion processing unit 6 further converts a digital value that is the conversion result in the first converting unit according to the second conversion characteristic. The computation unit 12 stores the digital value that is the conversion result in the conversion processing unit 6 as an A/D conversion value in the shared memory 13.

In this manner, the analog input unit 3 converts the input analog value to a digital value (an A/D conversion value) successively. The bus I/F 14 outputs an A/D conversion value read from the shared memory 13 to the inter-unit bus 5.

Figure 4:
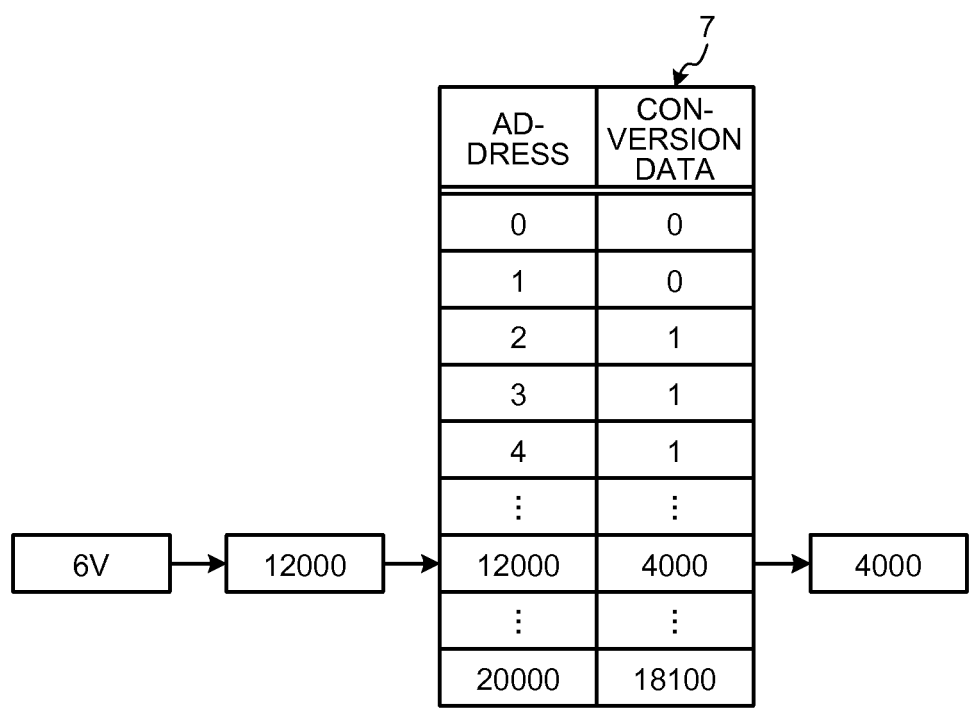
FIG. 4 is an explanatory diagram of an example of A/D conversion in an analog input unit.

FIG. 4 is an explanatory diagram of an example of A/D conversion in an analog input unit. In this example, it is assumed that an input range of an analog value in the A/D converting unit 11 is 0V to 10V. It is assumed that the resolution of a digital value in the A/D converting unit 11 relative to the input range is 1/20000.

For example, it is assumed that an analog value "6V" is input to the analog input unit 3. The analog input unit 3 converts "6V" to a digital value in the A/D converting unit 11 and adjusts the digital value according to the factory-shipment adjustment value 8.

Figure 5:
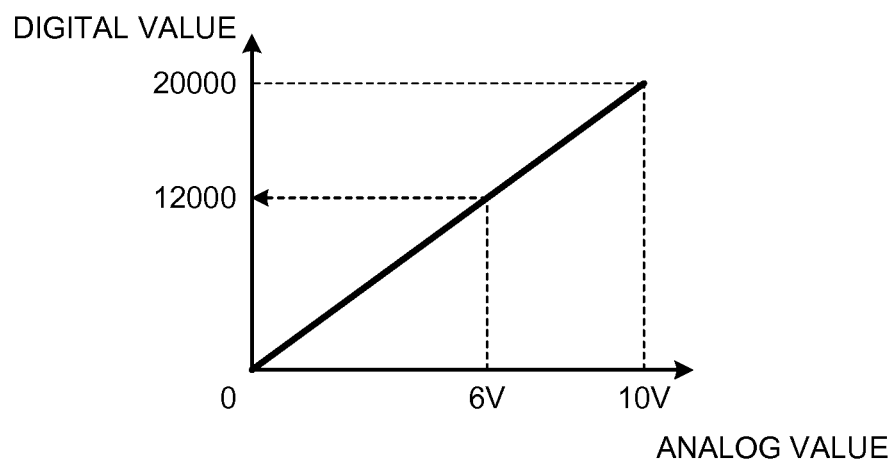
FIG. 5 is a diagram illustrating an example of a first conversion characteristic.

FIG. 5 is a diagram illustrating an example of the first conversion characteristic. In the illustrated two-dimensional graph, the horizontal axis represents an analog value and the vertical axis represents a digital value. The graph indicating the first conversion characteristic is a straight line connecting a point where both an analog value and a digital value are minimum and a point where both an analog value and a digital value are maximum. It is assumed that the gradient of the straight line of the first conversion characteristic is adjusted according to the factory-shipment adjustment value 8.

The analog input unit 3 converts the analog value "6V" to the digital value "12000" on the basis of the first conversion characteristic that has been calibrated. Sequentially, the conversion processing unit 6 reads the conversion data stored in the same row of address as the digital value "12000" from the conversion characteristic table 7. In this example, the conversion processing unit 6 reads the conversion data "4000" stored in the row of the address "12000". In this manner, the analog input unit 3 obtains the A/D conversion value "4000" from the input analog value "6V".

Figure 6:
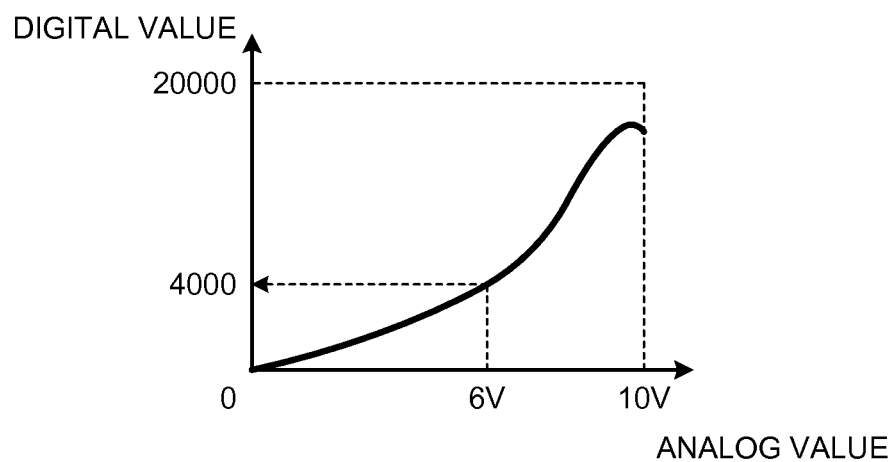
FIG. 6 is a diagram illustrating an example of a conversion characteristic obtained by combining the first conversion characteristic illustrated in FIG. 5 and a second conversion characteristic.

FIG. 6 is a diagram illustrating an example of a conversion characteristic obtained by combining the first conversion characteristic illustrated in FIG. 5 and the second conversion characteristic. The conversion characteristic illustrated in FIG. 6 represents an A/D conversion characteristic in the entire analog input unit 3. The graph illustrated in FIG. 6 indicates a relation between an analog value input to the analog input unit 3 and a digital value (an A/D conversion value) output from the analog input unit 3. While the first conversion characteristic is indicated by a straight-line graph as illustrated in FIG. 5, the conversion characteristic illustrated in FIG. 6 is indicated by a curved-line graph having unrestricted curves.

In the combinations of the address and the conversion data stored in the conversion characteristic table 7, each piece of the conversion data can be adjusted arbitrarily. In the conversion characteristic table 7, the second value of each of the combinations is adjusted in response to the operation from the personal computer 2 having the conversion-characteristic-table creation tool 9 installed therein. The pieces of the conversion data corresponding to the respective addresses in the conversion characteristic table 7 are appropriately changed; therefore, the conversion characteristic in the analog input unit 3 can be set with high flexibility.

Figure 7:
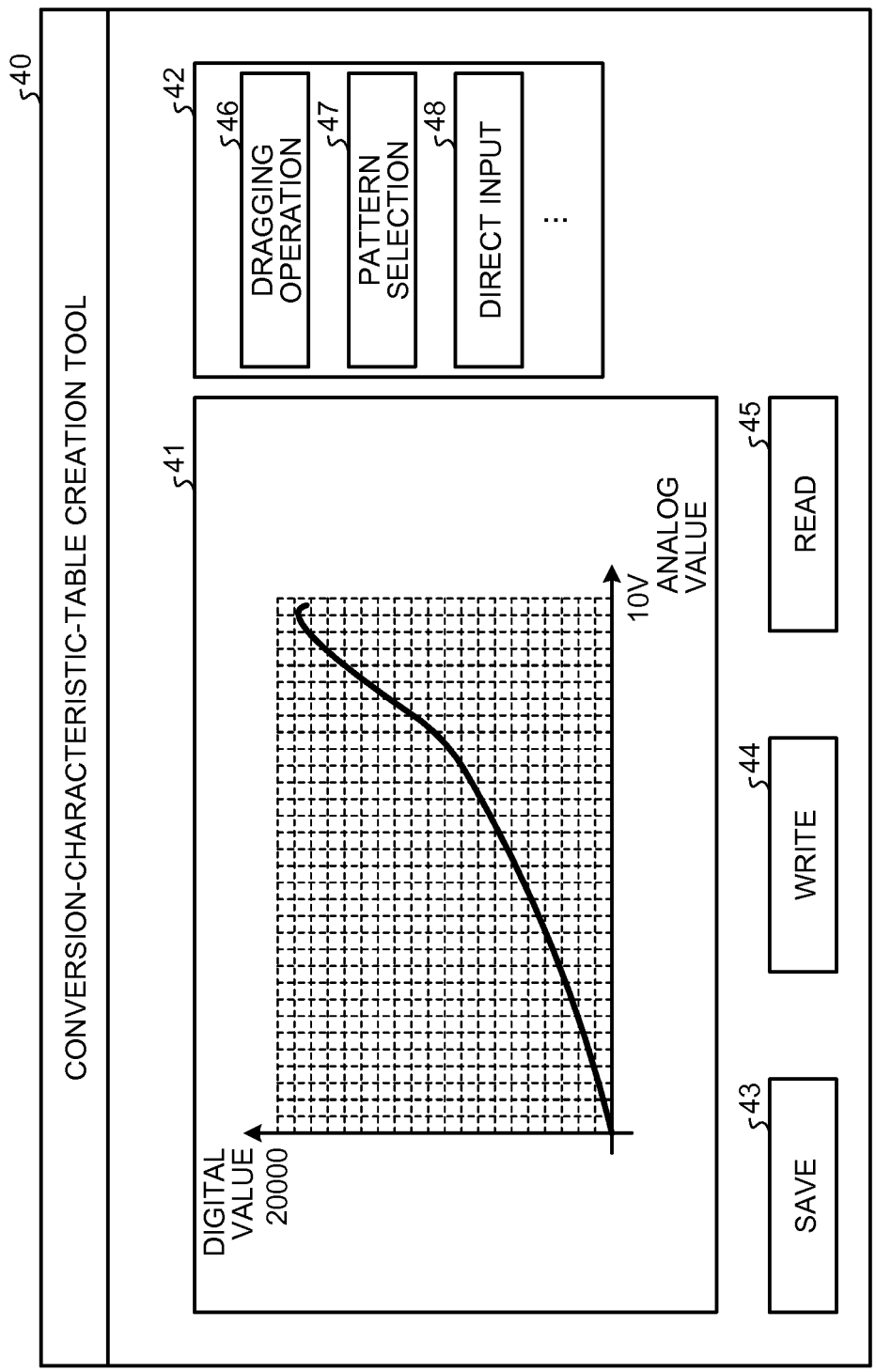
FIG. 7 is a diagram illustrating an example of a screen of a conversion-characteristic-table creation tool displayed on a display device.

Next, creation of the conversion characteristic table 7 by the conversion-characteristic-table creation tool 9 is described. FIG. 7 is a diagram illustrating an example of a screen of a conversion-characteristic-table creation tool displayed on a display device. The conversion-characteristic-table creation tool 9 displays a screen 40 for creating the conversion characteristic table 7 on the display device 32 that is a display unit. The conversion-characteristic-table creation tool 9 receives an operation for creating the conversion characteristic table 7 at the screen 40.

The screen 40 displays a graph screen 41, an operation selecting screen 42, a save button 43, a writing button 44, and a reading button 45. The graph screen 41 displays a graph indicating the conversion characteristic. The conversion-characteristic-table creation tool 9 obtains the total conversion characteristic by combining the first conversion characteristic and the second conversion characteristic indicated in the conversion characteristic table 7 that is being created. The conversion-characteristic-table creation tool 9 displays the total conversion characteristic on the graph screen 41.

In the operation selecting screen 42, buttons indicating various operation means for adjusting the content of the conversion characteristic table 7 are listed. For example, the operation selecting screen 42 displays a dragging operation button 46, a pattern selection button 47, and a direct input button 48. The operation selecting screen 42 receives a selection of the operation means through these buttons.

When the dragging operation button 46 is pressed, the conversion-characteristic-table creation tool 9 receives a dragging operation on a graph in the graph screen 41 by a pointing device of the input device 31 such as a mouse. The conversion-characteristic-table creation tool 9 deforms the graph according to the dragging operation.

When the pattern selection button 47 is pressed, the conversion-characteristic-table creation tool 9 receives an operation for selecting any one of the conversion characteristic patterns prepared in advance. The conversion-characteristic-table creation tool 9 displays a pattern selection screen on the screen 40 in response to the pressing of the pattern selection button 47.

Figure 8:
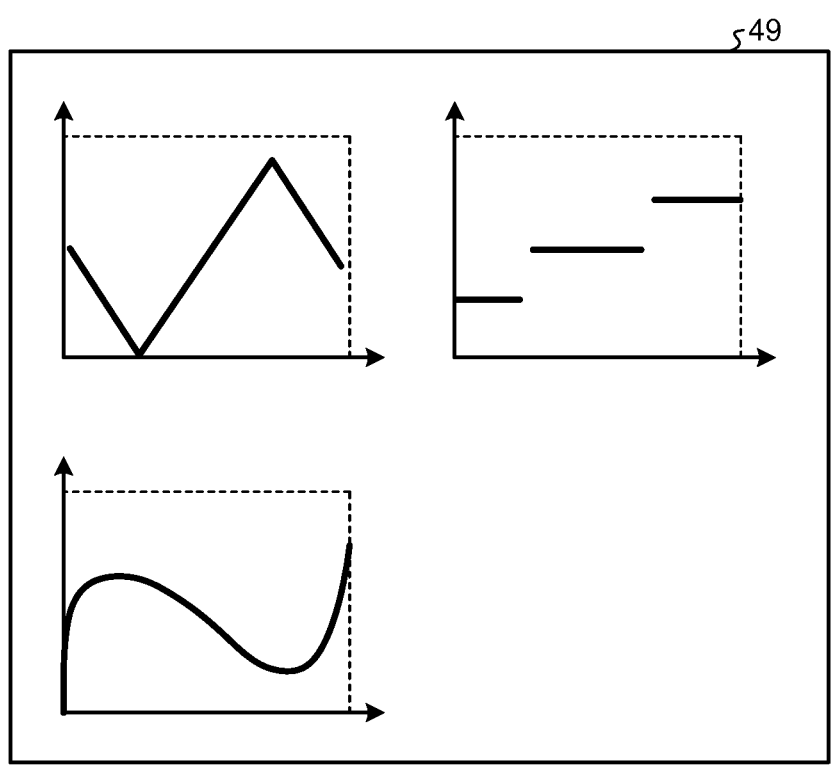
FIG. 8 is a diagram illustrating an example of a pattern selection screen.

FIG. 8 is a diagram illustrating an example of a pattern selection screen. When the pattern selection button 47 is pressed, the conversion-characteristic-table creation tool 9 displays a pattern selection screen 49 as a pop-up on the screen 40, for example. The pattern selection screen 49 displays the conversion characteristic patterns prepared in advance as graphs. The data of the conversion characteristic patterns is stored in the storage device 34, for example.

The conversion-characteristic-table creation tool 9 prepares, as the conversion characteristic patterns, a pattern of connected straight lines, a pattern of a curved line, and a pattern including discontinuous straight lines, for example. The conversion-characteristic-table creation tool 9 may prepare any pattern other than those described in the present embodiment as the selectable conversion characteristic pattern.

When a conversion characteristic pattern is selected on the pattern selection screen 49, the conversion-characteristic-table creation tool 9 changes the graph displayed on the graph screen 41 according to the selected conversion characteristic pattern. A user can further adjust the conversion characteristic on the basis of the selected conversion characteristic pattern.

When the direct input button 48 is pressed, the conversion-characteristic-table creation tool 9 receives an operation for directly rewriting the conversion data in the conversion characteristic table 7. The conversion-characteristic-table creation tool 9 displays the content of the conversion characteristic table 7 on the screen 40 in response to the pressing of the direct input button 48.

The conversion-characteristic-table creation tool 9 displays pieces of the data in several rows in the conversion characteristic table 7 as a pop-up. The user can adjust the conversion characteristic in detail by directly rewriting the pieces of the conversion data in the pop-up.

When the save button 43 is pressed, the conversion-characteristic-table creation tool 9 stores the conversion characteristic table 7 created according to the operation on the screen 40 in a specific folder in the storage device 34.

When the writing button 44 is pressed, the conversion-characteristic-table creation tool 9 writes the conversion characteristic table 7 stored in the storage device 34 into the shared memory 13. When the reading button 45 is pressed, the conversion-characteristic-table creation tool 9 reads the conversion characteristic table 7 stored in the shared memory 13 to the personal computer 2. The conversion-characteristic-table creation tool 9 stores the read conversion characteristic table 7 in the storage device 34.

For example, when the analog input unit 3 is shipped from the factory as a product, the shared memory 13 stores therein the conversion characteristic table 7 in an initial state. The conversion characteristic table 7 in an initial state stores the same values as the respective addresses in all the rows, as the conversion data. Creation of the conversion characteristic table 7 refers to adjusting a value of the conversion data in each row of the conversion characteristic table 7 in such a way that the total conversion characteristic obtained by combining the first conversion characteristic and the second conversion characteristic becomes a desired conversion characteristic.

When creation of the conversion characteristic table 7 is started, the conversion-characteristic-table creation tool 9 reads the conversion characteristic table 7 to the personal computer 2 in response to the pressing of the reading button 45. The storage device 34 stores therein the conversion characteristic table 7 read to the personal computer 2 and the data of the first conversion characteristic illustrated in FIG. 5, for example.

The conversion-characteristic-table creation tool 9 obtains the total conversion characteristic in the central processing unit 33 on the basis of the data of the first conversion characteristic and the content of the conversion characteristic table 7. The conversion-characteristic-table creation tool 9 displays the conversion characteristic obtained in the central processing unit 33 on the graph screen 41.

When the conversion characteristic table 7 is in an initial state, the total conversion characteristic matches the first conversion characteristic that is calibrated at the shipment. At this point, on the graph screen 41, a straight-line graph indicating the first conversion characteristic that is calibrated at the shipment is displayed as default.

The conversion-characteristic-table creation tool 9 receives an operation of the operation means selected on the operation selection screen 42, and adjusts the values of the conversion data of the conversion characteristic table 7 in the central processing unit 33. The central processing unit 33, which is an adjustment unit, adjusts the content of the conversion characteristic table 7 in response to the operation received at the screen 40. In the conversion characteristic table 7, the second value of each of the combinations of the first value and the second value can be adjusted.

For example, a dragging operation of pointing a certain point on the graph and moving the point to a certain direction allows the graph to have a curve according to the movement of the point. To change the relation between an analog value and a digital value in the total conversion characteristic according to the change of the shape of the graph, the central processing unit 33 rewrites the values of the conversion data of the conversion characteristic table 7.

The central processing unit 33 divides the input range of an analog value into plots, the number of which corresponds to the resolution of a digital value, and obtains a change amount of the digital value in each plot. The central processing unit 33 performs addition or subtraction using the change amounts obtained for the respective plots and the respective values of the conversion data. The central processing unit 33 rewrites the values of the conversion data to the results of the addition or subtraction.

In this manner, the central processing unit 33 adjusts the content of the conversion characteristic table 7 according to an operation to the graph displayed on the graph screen 41. Also when an operation for deforming the graph other than a dragging operation is performed, the central processing unit 33 adjusts the content of the conversion characteristic table 7 according to the operation. For example, when a conversion characteristic pattern is selected on the pattern selection screen 49, the central processing unit 33 rewrites the values of the conversion data in the conversion characteristic table 7 according to the deformation of the graph corresponding to the selected conversion characteristic pattern.

The central processing unit 33 automatically updates the values of the conversion data every time an operation for deforming the graph is performed. The graph screen 41 displays the content of the conversion characteristic table 7 at the time when the conversion characteristic table 7 is created, as a graph indicating the relation between an analog value and a digital value in the total conversion characteristic.

When an operation for directly rewriting the conversion data is performed, the central processing unit 33 rewrites the values of the conversion data in the conversion characteristic table 7 in response to the operation. The central processing unit 33 receives rewriting of the content of the conversion characteristic table 7 at the screen 40. The graph screen 41 displays a graph deformed according to the rewriting of the values of the conversion data.

The conversion-characteristic-table creation tool 9 may prepare any operations other than those described in the present embodiment as a selectable operation for adjusting the content of the conversion characteristic table 7.

Each time the save button 43 is pressed, the conversion-characteristic-table creation tool 9 stores the content of the conversion characteristic table 7 corresponding to the graph displayed on the graph screen 41 in a specific folder in the storage device 34. When the writing button 44 is pressed after the conversion characteristic table 7 is created, the conversion-characteristic-table creation tool 9 writes the conversion characteristic table 7 stored in the folder into the shared memory 13.

The conversion-characteristic-table creation tool 9 may perform adjustment not only on the content of the conversion characteristic table 7 in an initial state but also on the content of the conversion characteristic table 7 that has been adjusted previously in order to correct the content.

The analog input unit 3 can easily realize a significant change of the conversion characteristic by using the conversion characteristic table 7 in which the second value in each row can be adjusted arbitrarily. The analog input unit 3 can perform A/D conversion according to a free conversion characteristic without involving computation in the CPU unit 4. The analog input unit 3 can obtain a desired conversion characteristic without using a complicated program. The analog input unit 3 can sufficiently exhibit high-speed and fixed-cycle input/output performance. Accordingly, an effect is obtained where the analog input unit 3 can adjust the conversion characteristic freely by performing a simple operation without using a complicated program and sufficiently provide high-speed and fixed-cycle input/output performance.

The conversion-characteristic-table creation tool 9 graphically displays the total conversion characteristic on the screen 40. A user can easily recognize whether adjustment to a desired conversion characteristic has been completed by viewing the screen 40. The conversion-characteristic-table creation tool 9 adjusts the content of the conversion characteristic table 7 according to the operation to the graph displayed on the screen 40; therefore, the conversion characteristic can be adjusted by performing a simple operation with high flexibility. Accordingly, an effect is obtained where the conversion-characteristic-table creation tool 9 can create the conversion characteristic table 7 having a desired conversion characteristic by performing a simple operation while the conversion characteristic is visually checked.

The analog input unit 3 stores the conversion characteristic table 7 in the shared memory 13 that can perform writing and reading directly into and from the CPU unit 4. The conversion-characteristic-table creation tool 9 that operates in the personal computer 2 can read the conversion characteristic table 7 from the shared memory 13 and write the conversion characteristic table 7 into the shared memory 13, via the CPU unit 4 and the inter-unit bus 5.

The conversion characteristic table 7 read from an external memory such as a memory card may be stored in the shared memory 13. The external memory storing therein the conversion characteristic table 7 in advance is attached to the external memory I/F 20; therefore, the analog input unit 3 reads the conversion characteristic table 7 from the external memory via the CPU unit 4 and the inter-unit bus 5. The analog input unit 3 stores the conversion characteristic table 7 that is read from the external memory in the shared memory 13.

The PLC 1 may store the conversion characteristic table 7 stored in the shared memory 13 in an external memory. This allows the conversion characteristic table 7 created with the use of the conversion-characteristic-table creation tool 9 in one PLC system to be used in another PLC system.

The analog input unit 3 may register the conversion characteristic table 7 in the internal memory 15 that is a nonvolatile memory. The analog input unit 3 retains the conversion characteristic table 7 in the internal memory 15 even after the power is turned off. Accordingly, the data of the conversion characteristic table 7 does not need to be loaded into the shared memory 13 every time the analog input unit 3 is activated.

Second Embodiment

Figure 9:
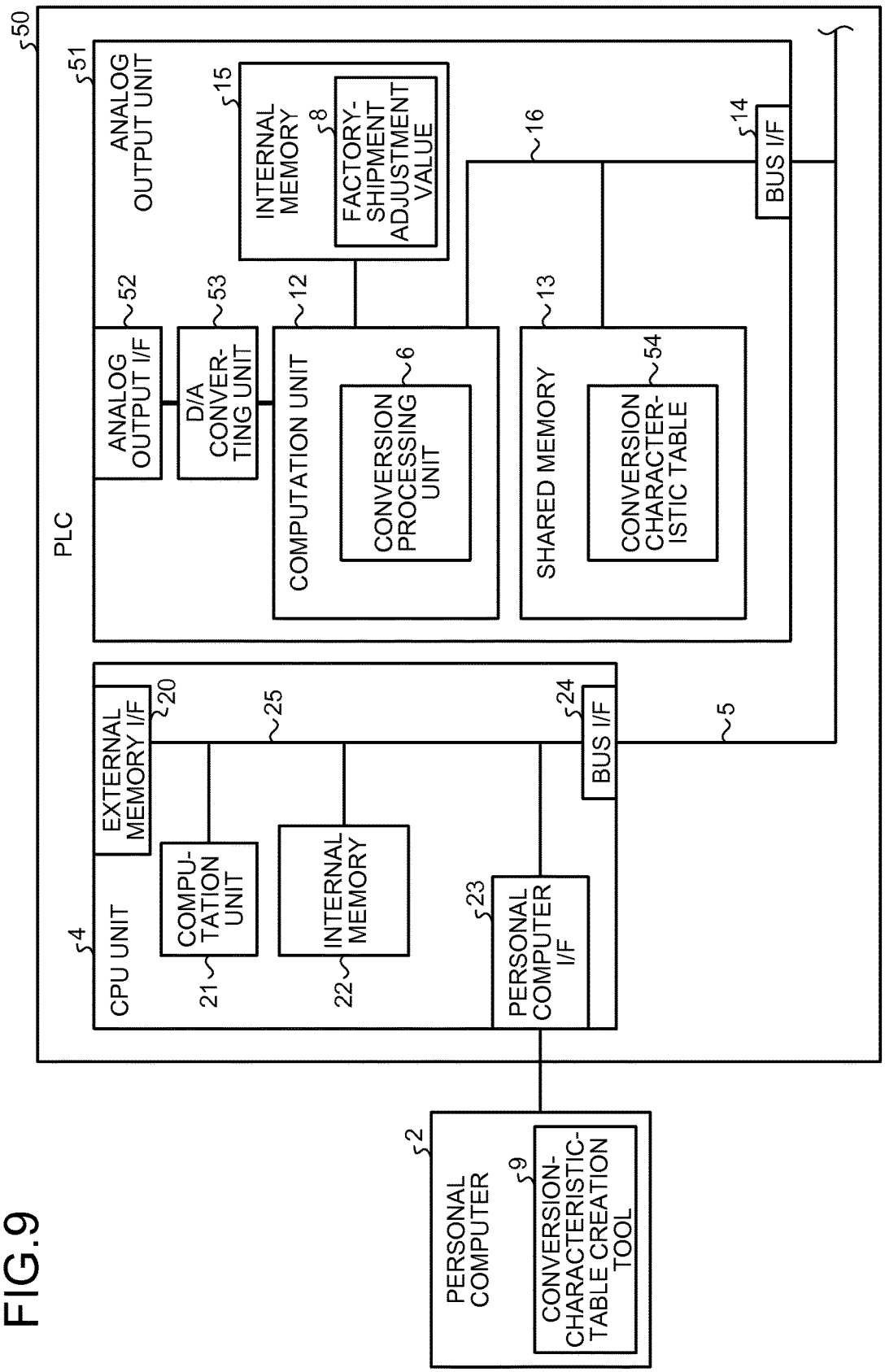
FIG. 9 is a block diagram illustrating a configuration of a PLC system according to a second embodiment of the present invention.

FIG. 9 is a block diagram illustrating a configuration of a PLC system according to a second embodiment of the present invention. The PLC system according to the second embodiment includes an analog output unit 51, which is an analog unit. Constituent elements identical to those of the first embodiment are denoted by identical reference signs and redundant explanations thereof will be omitted as appropriate.

The analog output unit 51 is attached to a PLC 50. The analog output unit 51 is connected to the CPU unit 4 via the inter-unit bus 5. The analog output unit 51 and the CPU unit 4 constitute a part of the PLC 50.

The analog output unit 51 receives a digital value from the CPU unit 4 via the inter-unit bus 5. The analog output unit 51 converts the input digital value to an analog value (a D/A conversion value) successively.

The analog output unit 51 includes an analog output interface (I/F) 52, a D/A converting unit 53, the computation unit 12, the shared memory 13, the bus interface (I/F) 14, and the internal memory 15. The analog output I/F 52 outputs an analog value from the analog output unit 51 to the outside.

The D/A converting unit 53 converts a digital value to an analog value. The conversion processing unit 6 converts a digital value received by the analog output unit 51 via the inter-unit bus 5. The shared memory 13 stores therein the computation result by the computation unit 12 and a conversion characteristic table 54. The bus I/F 14 receives an input of a digital value from the inter-unit bus 5 to the analog output unit 51.

The conversion processing unit 6 converts a digital value input to the bus I/F 14 according to a second conversion characteristic. The conversion processing unit 6 converts a digital value by referring to the conversion characteristic table 54 retained in the shared memory 13. The conversion characteristic table 54 indicates the second conversion characteristic of conversion between digital values. In this manner, the analog output unit 51 temporarily converts a digital value on the basis of the second conversion characteristic.

The computation unit 12 performs computation on a digital value that is the conversion result by the conversion processing unit 6 according to the factory-shipment adjustment value 8 read from the internal memory 15. The D/A converting unit 53 converts the digital value on which the computation according to the factory-shipment adjustment value 8 has been performed to an analog value.

The D/A converting unit 53, which is the first converting unit, performs D/A conversion of digital values to analog values. The D/A converting unit 53 performs conversion between digital values and analog values according to a first conversion characteristic. The D/A converting unit 53 converts a digital value to an analog value on the basis of the first conversion characteristic that is calibrated at the shipment.

In this manner, the analog output unit 51 converts an input digital value to an analog value (a D/A conversion value) successively. The analog output I/F 52 outputs an analog value that is the conversion result in the D/A converting unit 53 as a D/A conversion value.

Figure 10:
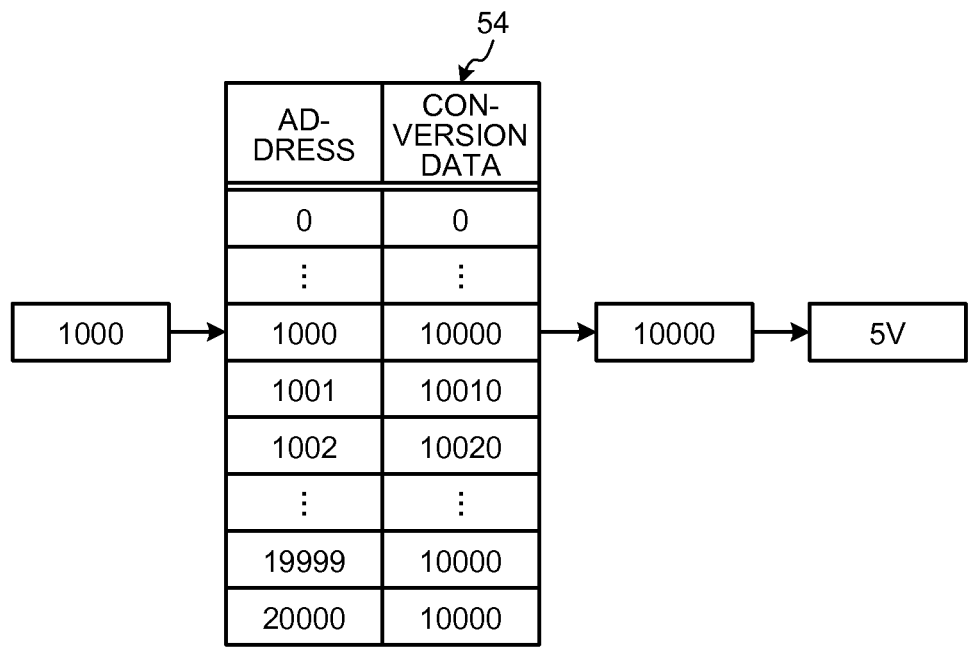
FIG. 10 is an explanatory diagram of an example of D/A conversion in an analog output unit.

FIG. 10 is an explanatory diagram of an example of D/A conversion in an analog output unit. The conversion characteristic table 54 includes a column indicating addresses and a column indicating conversion data. Each value stored in the column of addresses represents a digital value input to the bus I/F 14. Each value stored in the column of addresses is a first value.

Each value stored in the column of conversion data represents a digital value that is the conversion result from the digital value that is the first value. Each value stored in the column of conversion data is a second value. Each row of the conversion characteristic table 54 indicates a combination of the first value and the second value.

The conversion characteristic table 54 includes combinations of the first value and the second value, the number of which corresponds to the resolution of a digital value in the analog output unit 51. The conversion characteristic table 54 includes pieces of the conversion data corresponding to the respective digital values that can be input to the analog output unit 51. The analog output unit 51 loads the data of the conversion characteristic table 54 into the shared memory 13 from which data can be read at high speed.

For example, it is assumed that a digital value "1000" is input to the analog output unit 51. The conversion processing unit 6 reads the conversion data stored in the same row as the address of the digital value "1000" from the conversion characteristic table 54. In this example, the conversion processing unit 6 reads the conversion data "10000" that is stored in the row of the address "1000".

Subsequently, the analog output unit 51 adjusts the digital value "10000" according to the factory-shipment adjustment value 8. The D/A converting unit 53 converts a digital value obtained by adjusting "10000" to an analog value "5V" on the basis of the same first conversion characteristic as that in the first embodiment illustrated in FIG. 5, for example. In this manner, the analog output unit 51 obtains the D/A conversion value "5V" from the input digital value "1000".

Figure 11:
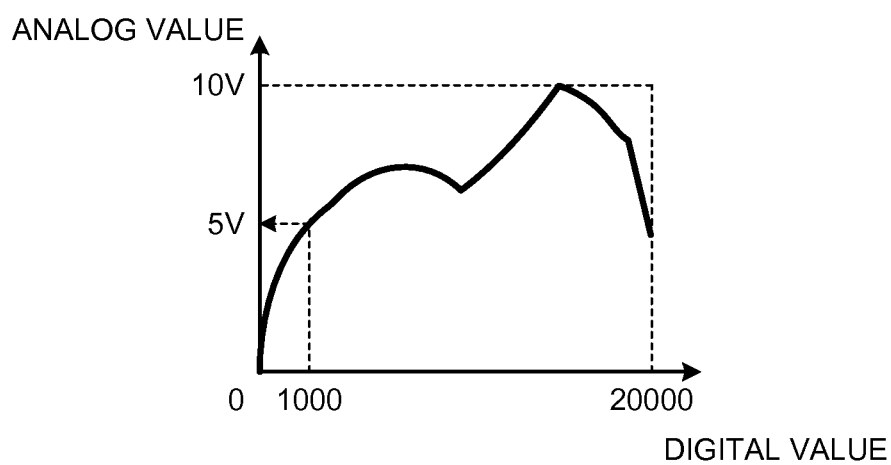
FIG. 11 is a diagram illustrating an example of a conversion characteristic obtained by combining a first conversion characteristic and a second conversion characteristic.

FIG. 11 is a diagram illustrating an example of a conversion characteristic obtained by combining the first conversion characteristic and the second conversion characteristic. The conversion characteristic illustrated in FIG. 11 represents a D/A conversion characteristic in the entire analog output unit 51. The graph illustrated in FIG. 11 indicates a relation between a digital value input to the analog output unit 51 and an analog value (a D/A conversion value) output from the analog output unit 51. While the first conversion characteristic is indicated by a straight-line graph as illustrated in FIG. 5, for example, the conversion characteristic illustrated in FIG. 11 is indicated by a curved-line graph having unrestricted curves.

In the combinations of the address and the conversion data stored in the conversion characteristic table 54, each piece of the conversion data can be adjusted arbitrarily. In the conversion characteristic table 54, the second value of each of the combinations is adjusted in response to the operation from the personal computer 2 having the conversion-characteristic-table creation tool 9 installed therein. The pieces of the conversion data corresponding to the respective addresses in the conversion characteristic table 54 are appropriately changed; therefore, the conversion characteristic in the analog output unit 51 can be set with high flexibility.

Similarly to the analog input unit 3 according to the first embodiment, the analog output unit 51 can easily realize a significant change of the conversion characteristic by using the conversion characteristic table 54 in which the second value in each row can be adjusted arbitrarily. Similarly to the analog input unit 3, an effect is obtained where the analog output unit 51 can adjust the conversion characteristic freely by performing a simple operation without using a complicated program and sufficiently provide high-speed and fixed-cycle input/output performance.

The conversion-characteristic-table creation tool 9 can create the conversion characteristic table 54 of the present embodiment in the same manner as the case of the conversion characteristic table 7 of the first embodiment. The conversion-characteristic-table creation tool 9 can create the conversion characteristic table 54 having a desired conversion characteristic by performing a simple operation while the conversion characteristic is visually checked.

Third Embodiment

Figure 12:
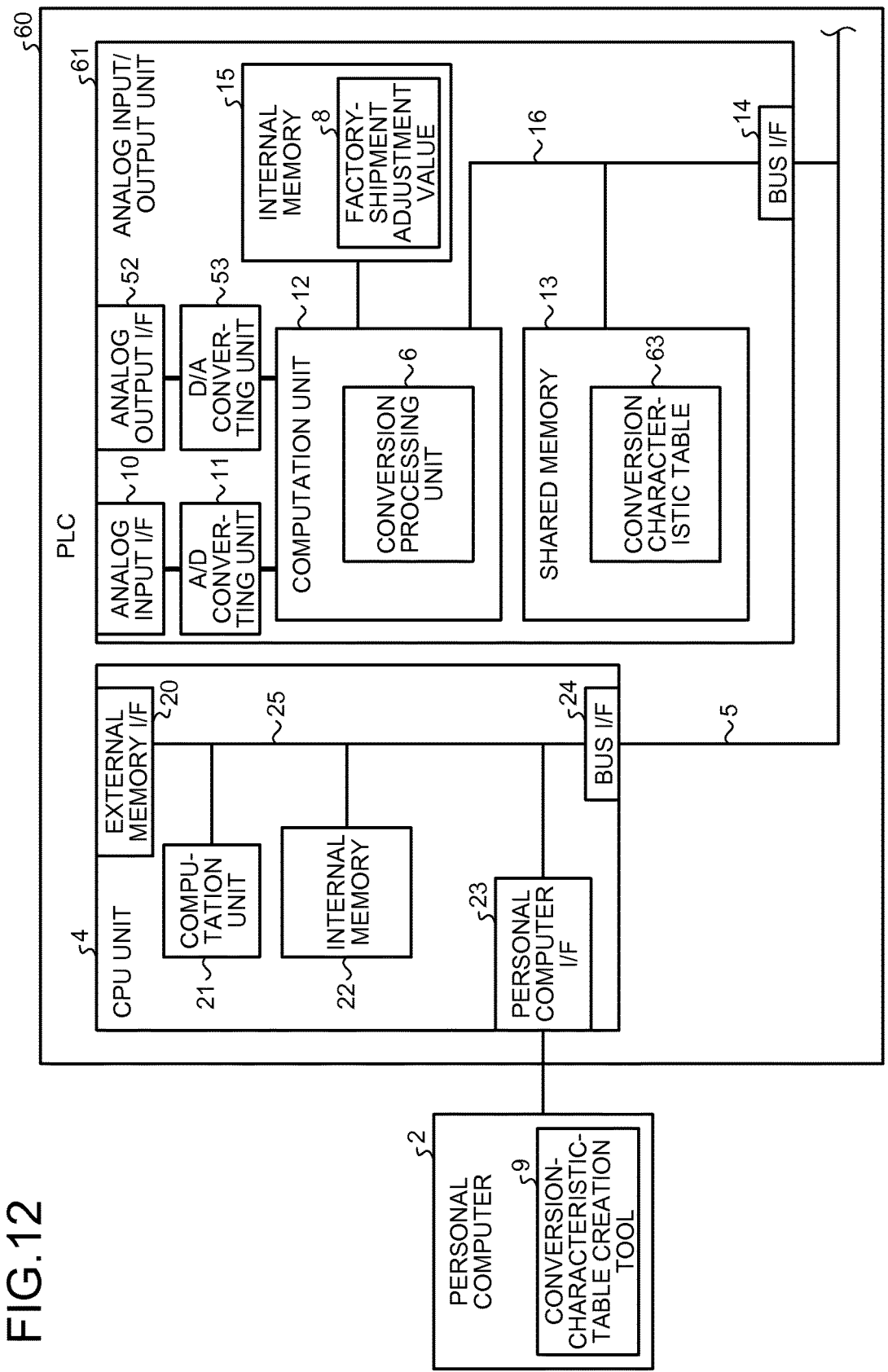
FIG. 12 is a block diagram illustrating a configuration of a PLC system according to a third embodiment of the present invention.

FIG. 12 is a block diagram illustrating a configuration of a PLC system according to a third embodiment of the present invention. The PLC system according to the third embodiment includes an analog input/output unit 61, which is an analog unit. The analog input/output unit 61 has an A/D conversion function and a D/A conversion function. The analog input/output unit 61 further has a function of performing an analog output corresponding to an analog input. Constituent elements identical to those of the first and second embodiments are denoted by identical reference signs and redundant explanations thereof will be omitted as appropriate.

The analog input/output unit 61 is attached to a PLC 60. The analog input/output unit 61 is connected to the CPU unit 4 via the inter-unit bus 5. The analog input/output unit 61 and the CPU unit 4 constitutes a part of the PLC 60.

The analog input/output unit 61 receives an input of an analog value to the PLC 60 from the outside. The analog input/output unit 61 temporarily converts the input analog value to a digital value. The analog input/output unit 61 further converts the digital value to an analog value.

The analog input/output unit 61 includes the analog input interface (I/F) 10, the A/D converting unit 11, the computation unit 12, the shared memory 13, the bus interface (I/F) 14, the internal memory 15, the analog output interface (I/F) 52, and the D/A converting unit 53.

The analog input/output unit 61 converts the analog value input to the analog input I/F 10 to a digital value in the A/D converting unit 11, which is a first converting unit. The computation unit 12 performs computation on the digital value that is the conversion result in the A/D converting unit 11 according to the factory-shipment adjustment value 8 read from the internal memory 15.

The conversion processing unit 6, which is a second converting unit, converts the digital value on which the computation according to the factory-shipment adjustment value 8 has been performed according to a second conversion characteristic. The conversion processing unit 6 converts a digital value by referring to a conversion characteristic table 63 retained in the shared memory 13. The conversion characteristic table 63 indicates the second conversion characteristic of conversion between digital values.

The computation unit 12 performs computation on a digital value that is the conversion result in the conversion processing unit 6 according to the factory-shipment adjustment value 8. The D/A converting unit 53, which is the first converting unit, converts the digital value on which the computation according to the factory-shipment adjustment value 8 has been performed to an analog value. In this manner, the analog input/output unit 61 converts the input analog value to an analog value as an output successively.

Figure 13:
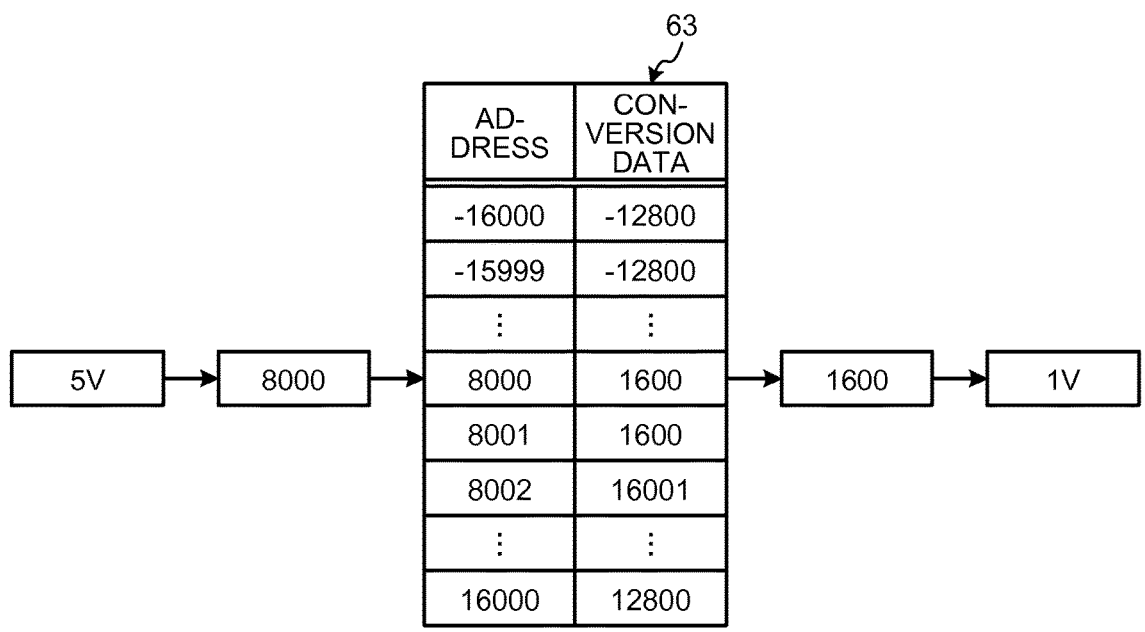
FIG. 13 is an explanatory diagram of an example of conversion of an analog input to an analog output in an analog input/output unit.

FIG. 13 is an explanatory diagram of an example of conversion of an analog input to an analog output in an analog input/output unit. The conversion characteristic table 63 includes a column indicating addresses and a column indicating conversion data. Each value stored in the column of addresses represents a digital value that is the conversion result in the A/D converting unit 11. Each value stored in the column of addresses is a first value.

Each value stored in the column of conversion data represents a digital value that is the conversion result from the digital value that is the first value. Each value stored in the column of conversion data is a second value. Each row in the conversion characteristic table 63 indicates a combination of the first value and the second value.

The conversion characteristic table 63 includes combinations of the first value and the second value, the number of which corresponds to the resolution of a digital value in the analog input/output unit 61. The conversion characteristic table 63 includes pieces of the conversion data corresponding to the respective digital values that can be obtained by the conversion from an analog value input to the analog input/output unit 61. The analog input/output unit 61 loads the data of the conversion characteristic table 63 into the shared memory 13 from which data can be read at high speed.

For example, it is assumed that an analog value "5V" is input to the analog input/output unit 61. The analog input/output unit 61 converts "5V" to a digital value in the A/D converting unit 11 and adjusts the digital value according to the factory-shipment adjustment value 8. The analog input/output unit 61 converts the analog value "5V" to, for example, a digital value "8000" on the basis of a first conversion characteristic that has been calibrated.

Subsequently, the conversion processing unit 6 reads the conversion data stored in the same row as the address of the digital value "8000" from the conversion characteristic table 63. In this example, the conversion processing unit 6 reads the conversion data "1600" stored in the row of the address "8000".

Subsequently, the analog input/output unit 61 adjusts the digital value "1600" according to the factory-shipment adjustment value 8. The D/A converting unit 53 converts the digital value obtained by adjusting "1600" to an analog value "1V", for example. In this manner, the analog input/output unit 61 obtains the analog value "1V" as an output from the input analog value "5V".

Figure 14:
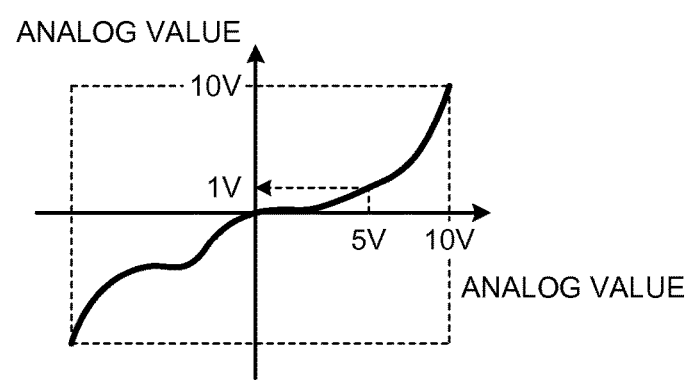
FIG. 14 is a diagram illustrating an example of a conversion characteristic obtained by combining a first conversion characteristic and a second conversion characteristic.

FIG. 14 is a diagram illustrating an example of a conversion characteristic obtained by combining the first conversion characteristic and the second conversion characteristic. The conversion characteristic illustrated in FIG. 14 represents a conversion characteristic from an analog input to an analog output in the entire analog input/output unit 61. The graph illustrated in FIG. 14 indicates a relation between an analog value input to the analog input/output unit 61 and an analog value output from the analog input/output unit 61. While the first conversion characteristic is indicated by a straight-line graph as illustrated in FIG. 5, for example, the conversion characteristic illustrated in FIG. 14 is indicated by a curved-line graph having unrestricted curves.

In the combinations of the address and the conversion data stored in the conversion characteristic table 63, each piece of the conversion data can be adjusted arbitrarily. In the conversion characteristic table 63, the second value of each of the combinations is adjusted in response to the operation from the personal computer 2 having the conversion-characteristic-table creation tool 9 installed therein. The pieces of the conversion data corresponding to the respective addresses in the conversion characteristic table 63 are appropriately changed; therefore, the conversion characteristic in the analog input/output unit 61 can be set with high flexibility.

Similarly to the analog input unit 3 according to the first embodiment and the analog output unit 51 according to the second embodiment, the analog input/output unit 61 can easily realize a significant change of the conversion characteristic by using the conversion characteristic table 63 in which the second value in each row can be adjusted arbitrarily. Similarly to the analog input unit 3 and the analog output unit 51, an effect is obtained where the analog input/output unit 61 can adjust the conversion characteristic freely by performing a simple operation without using a complicated program and sufficiently provide high-speed and fixed-cycle input/output performance.

The conversion-characteristic-table creation tool 9 can create the conversion characteristic table 63 of the present embodiment in the same manner as the cases of the conversion characteristic tables 7 and 54 according to the first and second embodiments. The conversion-characteristic-table creation tool 9 can create the conversion characteristic table 63 having a desired conversion characteristic by performing a simple operation while the conversion characteristic is visually checked.

The configurations of the analog input unit 3, the analog output unit 51, and the analog input/output unit 61, which are analog units according to the respective embodiments, may be applied to a device other than an analog unit such as a counter unit for counting an input pulse.

REFERENCE SIGNS LIST

1 PLC, 2 personal computer, 3 analog input unit, 4 CPU unit, 5 inter-unit bus, 6 conversion processing unit, 7 conversion characteristic table, 8 factory-shipment adjustment value, 9 conversion-characteristic-table creation tool, 10 analog input I/F, 11 A/D converting unit, 12 computation unit, 13 shared memory, 14 bus I/F, 15 internal memory, 20 external memory I/F, 21 computation unit, 22 internal memory, 23 personal computer I/F, 24 bus I/F, 25 internal bus, 31 input device, 32 display device, 33 central processing unit, 34 storage device, 40 screen, 41 graph screen, 42 operation selecting screen, 43 save button, 44 writing button, 45 reading button, 46 dragging operation button, 47 pattern selection button, 48 direct input button, 49 pattern selection screen, 50 PLC, 51 analog output unit, 52 analog output I/F, 53 D/A converting unit, 54 conversion characteristic table, 60 PLC, 61 analog input/output unit, 63 conversion characteristic table.

The invention claimed is:

1. A programmable controller system comprising:
   a programmable controller that includes an analog unit; and
   a conversion-characteristic-table creation device that is connected to the programmable controller and creates a conversion characteristic table, wherein
   the analog unit includes
      a first converter to convert an analog value to a first digital value based on a first conversion characteristic, and
      a second converter to convert the first digital value to a second digital value based on a second conversion characteristic obtained from the conversion characteristic table, the conversion characteristic table comprising the first digital value and the second digital value,
   the conversion-characteristic-table creation device comprises
      a display to display a first graph indicating a conversion characteristic obtained by combining the first conversion characteristic and the second conversion characteristic indicated in the conversion characteristic table, and display a list of candidate graphic shapes, and
      an adjuster to adjust, in response to a graphic shape being selected from the list of candidate graphic shapes, the second digital value of the conversion characteristic table to reflect the selected graphic shape, and control the display to display a second graph based on the adjusted second digital value.

2. The programmable controller system according to claim 1, wherein
   the analog unit further includes
      an analog input interface to receive an input of the analog value to the analog unit; and
      a bus interface that is connected to an inter-unit bus that connects units included in the programmable controller to each other, the first converter converts the analog value input to the analog input interface to the first digital value, the second converting unit converts the first digital value that is a conversion result by the first converter to the second digital value, and the bus interface outputs the second digital value that is a conversion result by the second converter to the inter-unit bus.

3. The programmable controller system according to claim 1, wherein the analog unit further includes an analog output interface to output the analog value from the analog unit; and a bus interface that is connected to an inter-unit bus that connects units included in the programmable controller to each other, the second converter converts the first digital value input from the inter-unit bus to the bus interface to the second digital value, the first converter converts the second digital value that is a conversion result by the second converter to the analog value, and the analog output interface outputs the analog value that is a conversion result by the first converter.

4. The programmable controller system according to claim 1, wherein the analog unit further includes an analog input interface that receives an input of the analog value to the analog unit; and an analog output interface to output the analog value from the analog unit, the first converter includes an analog-digital converter that converts the analog value input to the analog input interface to the first digital value and a digital-analog converter that converts the first digital value to the analog value, the second converter converts the first digital value that is a conversion result by the analog-digital converter to the second digital value, the digital-analog converter converts the second digital value that is a conversion result by the second converter to the analog value, and the analog output interface outputs the analog value that is a conversion result by the digital-analog converter.

5. The programmable controller system according to claim 1, wherein the analog unit further includes a retainer to store the conversion characteristic table, and the retainer is a shared memory from and into which data is to be read and written by a unit controlling the programmable controller.

6. The programmable controller system according to claim 1, wherein the display displays data included in the conversion characteristic table, and the adjuster receives a command to update the data included in the conversion characteristic table.

7. A conversion-characteristic-table creation device that creates a conversion characteristic table that is referred to in analog-to-digital conversion performed in an analog unit, the conversion-characteristic-table creation device comprising:

an adjuster to adjust data included in the conversion characteristic table, the data indicating a second conversion characteristic when a first conversion characteristic is used to perform conversion between an analog value and a first digital value and the second conversion characteristic is used to perform conversion between the first digital value and a second digital value; and a display to display a first graph indicating a conversion characteristic obtained by combining the first conversion characteristic and the second conversion characteristic indicated in the conversion characteristic table, and display a list of candidate graphic shapes, wherein in response to a graphic shape being selected from the list of candidate graphic shapes, the adjuster adjusts the second digital value of the conversion characteristic table to reflect the selected graphic shape and controls the display to display a second graph based on the adjusted second digital value.

8. The conversion-characteristic-table creation device according to claim 7, wherein the display displays the data included in the conversion characteristic table, and the adjuster receives a command to update the data included in the conversion characteristic table.

* * * * *